INVENTOR
KIYOSHE INOUE
BY *M K Murphy*
ATTORNEY

United States Patent Office 3,527,686
Patented Sept. 8, 1970

3,527,686
ELECTROCHEMICAL MACHINING
APPARATUS AND METHOD
Kiyoshi Inoue, Tokyo, Japan
(100 Sakato, Kawasaki, Kanagawa, Japan)
Filed Dec. 6, 1965, Ser. No. 511,827
Int. Cl. B23p 1/02
U.S. Cl. 204—224                   8 Claims

ABSTRACT OF THE DISCLOSURE

A method of and an apparatus for the electrolytic machining of a conductive workpiece with a tool electrode spacedly juxtaposed therewith. Machining is carried out with a succession of machining pulses which render the workpiece anodic to solubilize workpiece material in the electrolyte filling the gap. The gap-voltage/gap-current ratio is ascertained at each pulse and, upon deviation from a predetermined value, is used to control the power supply, the electrode supply to prevent further deviation and prevent discharge across the gap during subsequent pulses.

---

Figure 1:
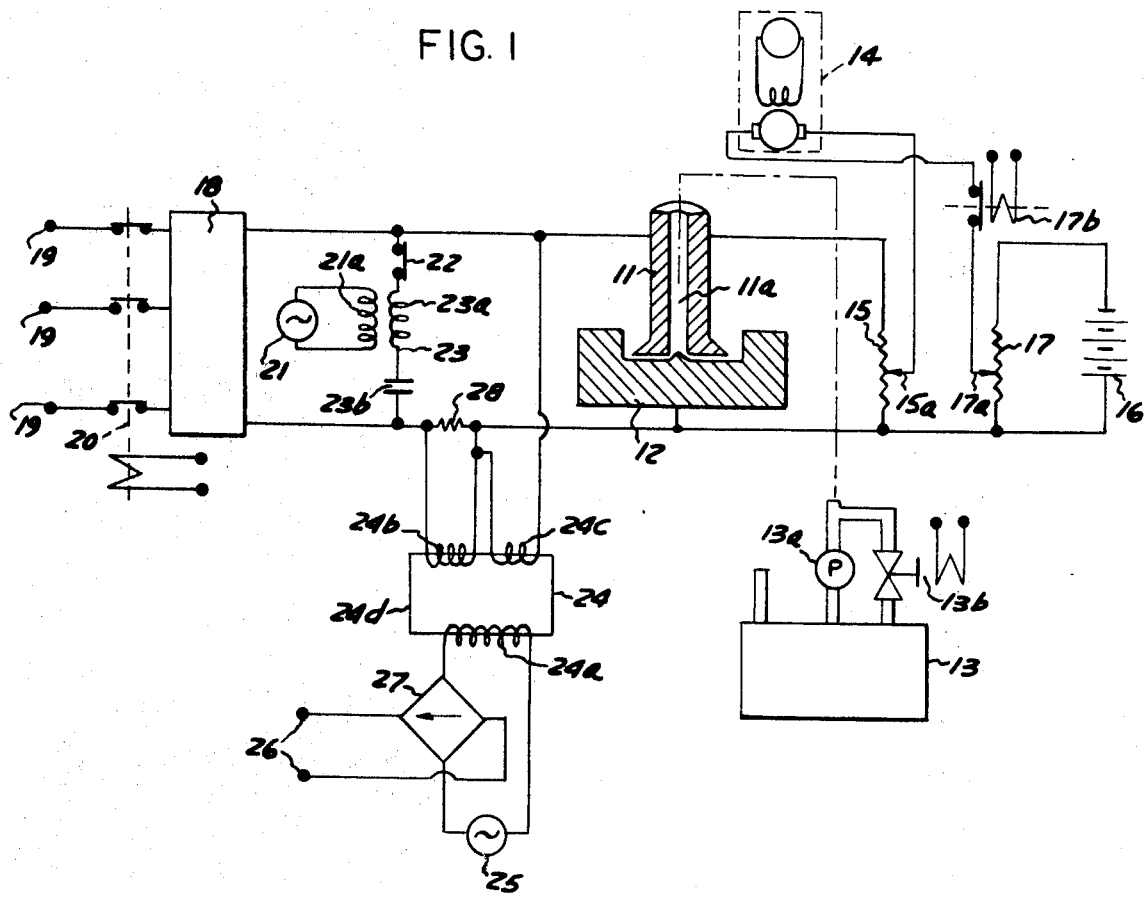

The present invention relates generally to electrochemical machining apparatus and, more particularly, to an electrical control system therefor.

In electrochemical machining, the workpiece which is electrically conductive is spaced from the tool electrode across a gap to which an electrolytic liquid is supplied at predetermined pressure and in predetermined quantity.

An electrical power supply is connected across the machining gap to remove material from the workpiece. The process is basically that of anodic dissolution of the workpiece in conformance with Faraday's law.

In the typical electrochemical machining apparatus, the following measures are taken; insulation of the surfaces other than the machining face of the machining electrode; maintenance of the machining electric current density at a constant value; maintenance of the feed speed of the machining electrode at a constant value; and reduction of the machining time by accelerating the machining speed.

However, with acceleration of the electrochemical machining process, the machining gap formed between the electrode and the workpiece is sometimes accompanied by an electro-discharge and at the same time, by such detrimental phenomena as short-circuiting of the gap with resultant damage to electrode, workpiece or both. The measures which have been taken hitherto to avoid these conditions were to maintain control of the servo-feed system providing relative approach of the electrode and workpiece, to maintain control of the electrical power supply and to control the flow rate and pressure of the electrolytic liquid supplied to the gap. However, these controlling functions take effect after the detection of decrease of the machining gap voltage or transient increase of the machining current following the actual generation of the electro-discharge in the machining gap. Accordingly, it takes some time before the controlling procedures limited by a certain time constant take effect and it has been impossible by these methods to prevent the electro-discharge or short-circuit condition from occurring.

It is the purpose of the present invention to control machining conditions so as to reduce the likelihood of occurrence of the above-mentioned electro-discharge current or short-circuit current by detecting the particular transient tendency, at an early stage prior to the time when the machining gap indicates the transition to such electro-discharge or short-circuit and to prevent its occurrence.

It is an object of my invention to provide an improved electrical control system for electrochemical machining in which signals are derived representative of gap current and gap voltage, respectively. These signals are furnished to a control means which is operable responsive to deviations of these signals from a predetermined relationship to initiate a corrective control over a suitable element of the apparatus to prevent the occurrence of gap short circuit condition.

Figure 2:
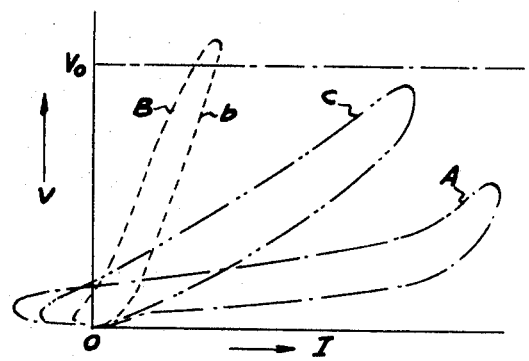

Other objects and advantages of the present invention will become apparent from the following description taken in connection with the accompanying drawings, in which:

FIG. 1 is a schematic drawing showing an embodiment of the present invention; and FIG. 2 is a voltage-current characteristic curve illustrating the principle of operation relation to the present invention.

With reference to FIG. 1, a machining electrode 11 is shown which is juxtaposed with a workpiece 12. Within the machining gap thus formed, an electrolyte liquid is circulated under pressure through a passage 11a formed inside the electrode 11. The electrolyte supply 13 comprises a filtering apparatus and storage tank. A liquid-supply pump 13a is provided with an electromagnetic valve 13b which controls the flow rate of the electrolyte liquid to be supplied to the gap.

The numeral 14 represents an electrode servo feed system including an electric motor for maintaining the spaced gap relationship between electrode 11 and workpiece 12. In the particular example of apparatus illustrated, the motor control winding is connected at one terminal to the wiper of a potentiometer 15 which is connected across the machining gap. A reference voltage is provided at the other terminal by a DC source 16 connected across potentiometer 17 whose wiper is tied to this other terminal. Responsive to the voltage difference between points 15a and 17a, the operation of the servo motor can be controlled. Switch 17b represents a control switch operatively connected in the electrical servo feed system 14. The numeral 18 represents a source of the machining power pulses of comparatively low frequency furnished to the machining gap. An example of a suitable power supply is a three-phase alternating current half-wave rectified electric power source with one of the three windings of the secondary circuit connected in the opposite direction as shown in my copending U.S. application Ser. No. 316,955, filed on Oct. 17, 1963, entitled "Ion Control System for Electrochemical Machining." Terminals 19 are input terminals connectible to an alternating current power source. An electrical power source controlling switch 20 is connected as shown for a purpose which will be explained hereinafter. A high-frequency electric power source 21 is provided including a high-frequency coil 21a operatively connected to an inductance coil 23a of a series connected resonance circuit 23 consisting of the above mentioned inductance coil 23a connected in series with a capacitor 23 across the machining gap by means of a switch 22. It will be seen that the above mentioned low frequency direct current pulse-type source 18 has superimposed thereacross a high-frequency electrical waveform. The numeral 24 represents a magnetic amplifier which is provided with a main winding 24a connected in series with a rectifier 27 having output terminals 26. Magnetic amplifier 24 further has an electric current sensing winding 24b, a voltage sensing winding 24c, and an iron core 24d. The above mentioned current sensing winding 24b is connected across a resistor 28, which resistor is in series with machining power supply 18 and the machining gap. Voltage-sensing winding 24c has its terminals connected across the gap to sense gap voltage.

FIG. 2 represents characteristic curves of the machining voltage V versus machining current I which may be expressed as machining current density in a./cm.²

In FIG. 2, the closed curve A shown represents the status in the normal condition of operation when the machining gap is maintained at the predetermined dimension and, at the same time, the electrolyte fluid is provided at the predetermined flowing rate and quantity through the gap. The products of the anodic dissolution i.e. workpiece particles are being removed at the predetermined rate thus maintaining the predetermined electrical resistance in the machining gap. The electrical power pulse supplied from the pulse generating apparatus 18 just matches this predetermined value. Coincidental with the beginning of the power pulse of the pulse, the curve A starts from the origin point and develops into a closed curve as shown. When there is a sudden change in the dimension of the machining gap as caused, for example, by the electrode feeding apparatus 14 or by a variation in flow rate and quantity of the supplied electrolyte liquid, the above-mentioned curve A changes to a closed curve B or C showing a drastic change of the machining voltage V versus machining current I characteristic curve within the machining gap.

Namely, curve B shows a sharp upward turn at a point $b$ with an abrupt rise of the V/I characteristic. This indicates that, in spite of a slight change in the machining current I, the change of the machining voltage V tends to sharply increase. Further, the V/I characteristic curve of this kind is attributable to the fact that when the machining gap exceeds the predetermined dimension, there is increased voltage drop due to the electrolytic resistance of the machining gap which may tend to electro-discharge between workpiece and electrode. When the machining gap narrows below the predetermined dimension, gasification of the electrolytic liquid within the machining gap may be caused by means of electrolysis or of generation of the Joule's heat. This likewise tends toward increased gap resistance and further exhibits a tendency toward electro-discharge between the electrode and the workpiece with possible damage resulting.

Further, it is apparent that the curve C showing the characteristic V/I curve is located between curves A and B showing the intermediate condition. However, if this particular condition is allowed to continue, it appears very likely that the characteristic curve of V/I of the machining gap will tend to the condition of curve B. In other words, curves B and C reveal clear indication that the normal machining condition has transferred to abnormal machining condition. Otherwise stated, the individual functioning of the machining power source, servo feed apparatus and liquid supply apparatus are transferring from the predetermined balanced condition to the unbalanced condition. This unbalanced condition is apparent when the V/I characteristic curve so changes that the machining voltage V rises above the voltage level $V_0$, and the electro-discharge phenomenon actually occurs within the machining gap. This phenomenon not only causes destructive effects on the electrode 11 and the workpiece 12, but also facilitates in the next following operation cycle the generation of a further electro-discharge phenomenon in the location in which the prior electro-discharge has occurred.

In the event of the rise of the characteristic of the machining voltage V versus machining current I within the machining gap beyond the limit of the voltage level $V_0$ which is provided with a precautionary safety allowance at the stage prior to transfer to the predetermined generation of the electro-discharge phenomenon, it is necessary to detect this particular extreme condition and to control, at least one of the elements, namely, the electrolytic liquid supply apparatus 23, servo feed apparatus 14 or machining pulse forming apparatus 18, to make the V/I characteristic curve within the machining gap to return to the predetermined curve A. Depending upon the circumstances, it may be necessary to open the electric switch 20 of the electric power source to suspend the supply of the machining electric power or to stop the operation of the servo feed apparatus 14 by opening the switch 17b.

DESCRIPTION OF OPERATION

The present invention has been created to provide means to detect such abnormal condition within the machining gap before damage has occurred. With reference to FIG. 1, the magnetic amplifier 24 includes control windings 24b and 24c, which windings are excited by the machining electric current and the machining electrical voltage, respectively, in order to obtain the controlling signals based upon the above-mentioned detection, the turns ratio of the above-mentioned windings 24b and 24c is such that when the characteristic curve of the machining voltage versus the machining current within the machining gap, remains within the range of the above-mentioned curve A or the curve C, the excitation of the iron core 24d by the windings 24b and 24c is balanced. Accordingly, the difference in excitation remains negligibly small so that the control signal output from the control output terminal 26 in this case is extremely low. On the other hand, when the V/I characteristic curve within the machining gap rises toward the voltage $V_0$ as is the case with the curve B, then it is so arranged that the predetermined control signal output is obtained from the terminals 26.

When the predetermined control signal output is obtained from the terminal 26, because of irregularities found in the predetermined equilibrium conditions between power pulse output, electrolyte flow and servo feed, it is necessary to control the function of at least one of the above-mentioned elements. The procedure to be conducted at this time is to suspend temporarily the supply of the machining electric pulse power by means of opening, as mentioned above, the switch 20 or the switch 22. Alternatively, the feeding operation of the electrode 11 means may be interrupted by suspending the operation of the feed motor 14 through the operation of switch 17b or control may be exercised over the electromagnetic valve 13b operatively connected in the electrolyte fluid supply in order to increase the flow rate and quantity of the electrolyte liquid supplied to the gap.

It will thus be seen that I have provided a novel apparatus and method of control circuitry for electrochemical machining which control circuitry is operable in a timely manner to detect abnormal gap conditions and to prevent damage from occurring. While only a single embodiment of the present invention has been illustrated and described, it will be apparent to one skilled in the art that various changes and modifications may be made therein without departing from the spirit of the invention.

I claim:

1. An apparatus for electrochemically machining a conductive workpiece, comprising:
    a tool electrode spacedly juxtaposed with said workpiece across a machining gap;
    means for relatively displacing said workpiece and said tool electrode to maintain said gap;
    means for introducing a stream of electrolyte to said gap;
    a power supply connected to said gap to provide successive machining pulses thereto while rendering said workpiece anodic for electrolytic solubilization thereof during said pulses;
    means for deriving a signal representative of gap current;
    means for deriving a signal representative of gap voltage; and
    means for controlling the output from said power supply to said gap responsive to derivation of the ratio of said signals and the gap voltage/gap current ratio from a predetermined value.

2. The combination defined in claim 1 wherein the last-mentioned means comprises a magnetic amplifier having a pair of control coils, one of said coils being operatively connected across said gap for sensing gap voltage, and the other of said coils having its terminals connected across a resistor in series between said power supply and the gap for sensing gap current.

3. An apparatus for electrolytically machining a conductive workpiece comprising:
   a tool electrode spacedly juxtaposed with said workpiece across a machining gap;
   means for relatively displacing said workpiece and said tool electrode to maintain said gap;
   means for introduccing a stream of electrolyte to said gap;
   a power supply connected to said gap to provide electrical machining pulses thereto while rendering said workpiece anodic for electrolytic solubilization thereof during said pulses, said means for introducing electrolyte to said gap including
      a source of pressurized electrolyte fluid connected to said gap to provide electrolyte-fluid flow therethrough, and
      flow-control means connected between said fluid source and said gap;
   means for deriving a signal representative of gap voltage;
   means for deriving a signal representative of gap current; and
   means operatively connected to and controlling the operation of said flow-control means for increasing fluid flow to said gap in response to deviation of the ratio of said signals and the gap voltage/gap current ratio from a predetermined value.

4. An apparatus for electrolytically machining a conductive workpiece comprising:
   a tool electrode spacedly juxtaposed with said workpiece across a machining gap;
   means for relatively displacing said workpiece and said tool electrode to maintain said gap;
   means for introducing a stream of electrolyte to said gap;
   a power supply connected to said gap to provide electrical machining pulses thereto while rendering said workpiece anodic for electrolytic solubilization of said workpiece in the electrolyte in said gap during said machining pulses, said means for relatively displacing said electrode and said workpiece including servo feed means for providing relative movement between said electrode and workpiece;
   means for deriving a signal representative of gap current;
   means for deriving a signal representative of gap voltage; and
   means operatively connected to said servo feed means for controlling said servo feed means responsive to deviation of the ratio of said signals and the gap voltage/gap current ratio from a predetermined value.

5. An apparatus for electrolytically machining a conductive workpiece comprising:
   a tool electrode spacedly juxtaposed with said workpiece accross a mahining gap;
   means for relatively displacing said workpiece and said tool electrode to maintain said gap;
   means for introducing a stream of electrolyte to said gap;
   a power supply connected to said gap to provide electrical machining pulses thereto while rendering said workpiece anodic for electrolyticc solubilization thereof during said pulses;
   means for deriving a signal representative of gap current;
   means for deriving a signal representative of gap voltage;
   switching means connected between said power supply and said gap; and
   means for activating said switching means for interrupting power from said supply in response to deviation of the ratio of said signals and the gap voltage/gap current ratio from a predetermined value.

6. An apparatus for electrolytically machining a conductive workpiece, comprising:
   a tool electrode spacedly juxtaposed with said workpiece across a machining gap;
   means for relatively displaccing said workpiece and said tool electrode to maintain said gap;
   means for introducing a stream of electrolyte to said gap;
   a power supply connected to said gap for providing electrical machining pulses thereto while rendering said workpiece anodic for electrolytic solubilization thereof during said pulses, said means for introducing said electrolyte to said gap including
      a source of pressurized electrolyte connected to said gap to provide electrolyte flow thereto, and
      flow-control means connected between said source and said gap;
   means for deriving a signal representative of gap voltage;
   means for deriving a signal representative of gap current; and
   means operatively connected to and controlling the operation of said flow-control means for varying selectively the electrolyte flow to said gap in response to deviation of the ratio of said signals and the gap voltage/gap current ratio from a predetermined value.

7. An apparatus for electrolytically machining a conductive workpiece, comprising:
   a tool electrode spacedly juxtaposed with said workpiece across an electrolyte filled gap;
   servo feed means for maintaining said workpiece and electrode in substantially constant spaced relationship during machining;
   power-supply means for providing electrical machining pulses to said gap while rendering said workpiece anodic for electrolytic solubilization thereof during said pulses;
   electrolyte-supply means for furnishing electrolyte fluid flow to said gap;
   a sensing network for deriving a signal representative of gap current;
   a sensing network for deriving a signal representative of gap voltage; and
   circuit means for comparing the ratio of said signals and for controlling the operation of at least one of said servo feed means, said power-supply means and said electrolyte supply means responsive to variations in the relative magnitude of said signals and the gap voltage/gap current ratio from a preselected relationship.

8. An apparatus for electrochemically machining a conductive workpiece, comprising:
   a tool electrode spacedly juxtaposed with said workpiece across a machining gap;
   means for relatively displacing said workpiece and said tool electrode to maintain said gap;
   means for introducing a stream of electrolyte to said gap;
   a power supply connected to said gap to provide successive electrical machining pulses thereto while rendering said workpiece anodic for electrolytic solubilization thereof during said pulses;
   means for controlling the output from said power supply to said gap;
   said means including a magnetic amplifier including a pair of control coils and an output coil, one of said control coils connected across said gap for sensing gap voltage, and a resistor connected in series between said power supply and said gap, the other of said control coils connected across said resistor for sensing gap current;

and means operatively connected to the output of said power supply, adapted to control said output in response to deviation of the ratio of said signals and the gap voltage/gap current ratio from a predetermined value.

References Cited

UNITED STATES PATENTS

| | | | |
|---|---|---|---|
| 2,717,326 | 9/1955 | Gunton | 314—69 |
| 2,809,319 | 10/1957 | Steele et al. | 314—69 |
| 3,097,252 | 7/1963 | Robinson | 13—33 |
| 3,275,538 | 9/1966 | Haupt et al. | 240—143 |
| 3,288,693 | 11/1966 | Livshits | 204—143 |
| 3,328,279 | 6/1967 | Williams et al. | 204—228 |
| 3,365,381 | 1/1968 | Fromson | 204—143 |

ROBERT K. MIHALEK, Primary Examiner

U.S. Cl. X.R.

204—143, 225, 228